United States Patent Office 2,911,385
Patented Nov. 3, 1959

2,911,385

VINYL AROMATIC POLYMERS STABILIZED WITH OXIMES

William K. Schweitzer, Jr., Midland, Mich., assignor to The Dow Chemical Company, Midland, Mich., a corporation of Delaware No Drawing. Application July 2, 1956
Serial No. 595,069

12 Claims. (Cl. 260—45.9)

This invention concerns compositions of matter consisting essentially of polymerized monovinyl aromatic hydrocarbons and certain oximes as stabilizing agents for inhibiting the polymer against the embrittling and discoloring effects of light, heat or out-of-doors weathering.

Polystyrene is known to undergo undesirable physical changes upon prolonged exposure to light, heat or out-of-doors weathering. The observable symptoms of such changes are discoloration or embrittlement, or both, due in varying measure to the action of light or heat and air or oxygen, and is dependent in part upon the oxygen content of the atmosphere in which it is exposed, the temperature and the presence or absence of sunlight. These characteristics are shared to more or less extent by other polymerized monovinyl aromatic hydrocarbons of the benzene series such as vinyltoluene, vinylxylene, ethylvinylbenzene, isopropylstyrene, ethylvinyltoluene, tert.-butylstyrene or diethylvinyl benzene, or copolymers of such monovinyl aromatic hydrocarbons and styrene.

Since the uses of vinyl aromatic polymers include the manufacture of molded articles and thin film, either embrittlement or discoloration of the polymer is to be avoided. The provision of stabilized vinyl aromatic polymers, i.e. thermoplastic resins consisting of one or more polymerized monovinyl aromatic hydrocarbons of the benzene series, is the principal object of the invention.

According to the invention, the foregoing object is attained by mixing, preferably intimately incorporating, with a vinyl aromatic polymer from 0.5 to 5 percent by weight of an oxime having the general formula:

$$Y-C=N-OH$$
$$|$$
$$X$$

wherein X is a member of the group consisting of hydrogen and alkyl radicals, Y is a member of the group consisting of the aryl and alkyl radicals and X and Y together are a bivalent radical of the formula:

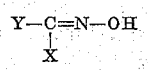

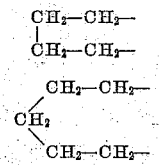

and

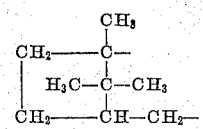

wherein both valences of the bivalent radical are attached to the carbon atom of the oxime radical.

Examples of suitable oximes are aldoxime, propionaldoxime, butyraldoxime, hexaldoxime, octaldoxime, 2-propanone oxime, 2-butanone oxime, cyclopentanone oxime, cyclohexanone oxime, 2-ketocamphanone oxime and 2-hexanone oxime. The oximes are employed in amounts corresponding to from 0.5 to 5, preferably from 0.5 to 2, percent by weight of the polymer.

The oxime stabilizing agent or a mixture of any two or more of such oximes can be incorporated with the normally solid vinyl aromatic polymer in usual ways such as by heat-plastifying the polymer on compounding rolls, a Banbury mixer or in a plastics extruder and thereafter blending or intimately mixing the oxime therewith in the desired proportion, or the polymer and the oxime can be dissolved in a common solvent and the latter evaporated to recover the polymer in admixture with the stabilizing agent.

In practice the vinyl aromatic polymer, suitably in granular form and in admixture with the oxime stabilizing agent in the desired proportion, is heat-plastified on compounding rolls, a Banbury mixer or in a plastics extruder and blended into a uniform composition. Thereafter, the composition is cooled and cut or ground to a granular form suitable for molding.

Small amounts of additives such as dyes, colors, pigments, plasticizers, flow agents, lubricants, etc., can also be incorporated with the vinyl aromatic polymers, but such additives are not required. When used, the additives are usually employed in amounts of from 0.1 to 10 percent by weight of the polymer.

The following examples illustrate ways in which the principle of the invention has been applied, but are not to be construed as limiting its scope.

EXAMPLE 1

In each of a series of experiments, a charge of 298.5 grams of molding grade polystyrene was heat-plastified by milling the same on a pair of laboratory compounding rolls, one of which rolls was heated at a temperature of 340° F. and the other at a temperature of 230° F. Thereafter, the heat-plastified polystyrene was milled with 1.5 grams of an oxime as stated in the following table for a period of about 6 minutes, then was removed, allowed to cool and ground to a granular form. Portions of the the composition were injection molded to form test plates having the dimension 2 x 2½ inches by 0.1 inch thick. These test pieces were used to determine the effect of the added oxime for inhibiting discoloration of the polystyrene upon exposure to out-of-doors weathering. The procedure for determining the stabilizing action of the oxime was to measure the percent of light of wave lengths between 420 and 620 millimicrons transmitted through a molded test piece as initially prepared. The difference between the amount of light transmitted at wave lengths of 420 and 620 millimicrons represents a measure of the color of the composition. The test pieces were then exposed to out-of-doors weathering in the State of Florida, U.S.A. at about latitude 25° North on a rack facing South with the test pieces inclined at an angle of 45 de-degrees above horizontal for a period of three months. After exposure of the test pieces of the composition to out-of-doors weathering for the test period, they were removed and again tested for color as previously described. The difference between the color of the composition as initially prepared and its color after exposure to out-of-doors weathering represents a measure of the coloration or yellowing of the polymer due to the weathering. The table identifies the compositions by naming the ingredients employed in preparing the same. The table also gives the color of the composition as initially prepared, its color after out-of-doors weathering and the coloration or yellowing of the composition. For purpose of comparison, test pieces of the polystyrene without a stabilizing agent were prepared and tested under similar conditions.

Table

| Run No. | Starting Materials | | Polystyrene, Percent | Product | | |
|---|---|---|---|---|---|---|
| | Oxime | | | Initial Color | Final Color | Yellowing |
| | Kind | Percent | | | | |
| 1 | 2-Propanone Oxime | 0.5 | 99.5 | 5.3 | 15.7 | 10.4 |
| 2 | 2-Ketocamphanone Oxime | 0.5 | 99.5 | 3.1 | 21.6 | 18.5 |
| 3 | Cyclopentanone Oxime | 0.5 | 99.5 | 5.9 | 18.1 | 12.2 |
| 4 | Butyraldoxime | 0.5 | 99.5 | 4.2 | 12.8 | 8.6 |
| 5 | None | 0.0 | 100 | 2.9 | 22.9 | 20.0 |

EXAMPLE 2

Polystyrene was intimately blended with benzaldoxime in amount corresponding to one percent by weight of the final composition employing procedures similar to those employed in Example 1. Portions of the composition were injection molded to form test plates which were subjected to out-of-doors weathering and tested by procedure employed in the preceding example. The composition had an initial color value of 4.4 and a color value of 11.3 after exposure to out-of-doors weathering for a period of three months. The color change or yellowing was only 6.9.

In contrast, polystyrene without a stabilizing agent had an initial color value of 2.9 and a color value of 25.3 after out-of-doors weathering under the same conditions.

I claim:

1. A composition of matter the essential constituents of which are a polymerized monovinyl aromatic hydrocarbon and as a stabilizing agent for inhibiting discoloring of the polymer upon exposure to light, heat and out-of-doors weathering, from 0.5 to 5 percent, based on the weight of the polymer of an oxime having the general formula:

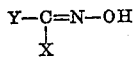

wherein X represents a member of the group consisting of hydrogen and alkyl radicals containing from 1 to 8 carbon atoms and Y represents a member of the group consisting of alkyl radicals containing from 1 to 8 carbon atoms and aryl radicals, and X and Y together represent a bivalent radical of the formula:

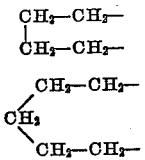

and

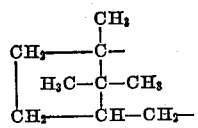

wherein both valences of the bivalent radical are attached to the carbon atom of the oxime radical.

2. A composition as claimed in claim 1, wherein the oxime is 2-propanone oxime.
3. A composition as claimed in claim 1, wherein the oxime is benzaldoxime.
4. A composition as claimed in claim 1, wherein the oxime is cyclopentanone oxime.
5. A composition as claimed in claim 1, wherein the oxime is butyraldoxime.
6. A composition as claimed in claim 1, wherein the oxime is 2-ketocamphanone oxime.
7. A composition of matter the essential constitutents of which are polystyrene and as a stabilizer for inhibiting discoloring of the polystyrene upon exposure to light, heat and out-of-doors weathering, from 0.5 to 5 percent, based on the weight of the polystyrene, of an oxime having the general formula:

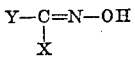

wherein X is a member of the group consisting of hydrogen and alkyl radicals containing from 1 to 8 carbon atoms and Y is a member of the group consisting of alkyl radicals containing from 1 to 8 carbon atoms and aryl radicals, and X and Y together are a bivalent radical of the formula:

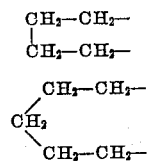

and

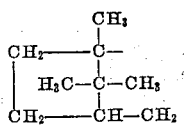

wherein both valences of the bivalent radical are attached to the carbon atom of the oxime radical.

8. A composition as claimed in claim 7, wherein the oxime is 2-propanone oxime.
9. A composition as claimed in claim 7, wherein the oxime is benzaldoxime.
10. A composition as claimed in claim 7, wherein the oxime is cyclopentanone oxime.
11. A composition as claimed in claim 7, wherein the oxime is 2-ketocamphanone oxime.
12. A composition as claimed in claim 7, wherein the oxime is butyraldoxime.

References Cited in the file of this patent

UNITED STATES PATENTS

| | | |
|---|---|---|
| 2,000,040 | Semon | May 7, 1935 |
| 2,268,418 | Paul | Dec. 30, 1941 |
| 2,336,598 | Downing et al. | Dec. 14, 1943 |
| 2,381,526 | Throdahl | Aug. 7, 1945 |
| 2,462,678 | Roedel | Feb. 22, 1949 |

OTHER REFERENCES

Gilman: "Organic Chemistry," vol. I, 2nd edition, Wiley & Sons, N.Y. (1943), page 652. (Copy in Div. 60.)